No. 800,466. PATENTED SEPT. 26, 1905.
J. MURRAY.
FASTENING FOR WINDOW SASHES.
APPLICATION FILED MAR. 3, 1903.

Witnesses.
J. A. Saul.
Geo. M. Copenhaver.

Inventor
James Murray
By E. B. Clark
Atty.

UNITED STATES PATENT OFFICE.

JAMES MURRAY, OF LONDON, ENGLAND.

FASTENING FOR WINDOW-SASHES.

No. 800,466.  Specification of Letters Patent.  Patented Sept. 26, 1905.

Application filed March 3, 1903. Serial No. 145,929.

*To all whom it may concern:*

Be it known that I, JAMES MURRAY, china and glass agent, a subject of the King of Great Britain, residing at 24 Bartlett's Buildings, Holborn Circus, London, England, have invented a certain new and useful Fastening for Window-Sashes, of which the following is a specification.

This invention relates to a device for securing together the adjacent ends or parts of various articles or structures, such as window-sashes, the objects being to render the operation of fastening capable of accomplishment more expeditiously and to insure greater security than is obtainable by the devices hitherto proposed.

The invention consists, essentially, of a volute or similarly-shaped device adapted to engage with and to exert a pressure upon studs or equivalent means provided on the parts intended to be fastened together. The device is held by frictional contact with the studs, its accidental dislodgment being obviated.

In order that the said invention may be clearly understood and readily carried into effect, I will proceed to describe the same more fully, with reference to the accompanying drawings, in which—

Figure 1:
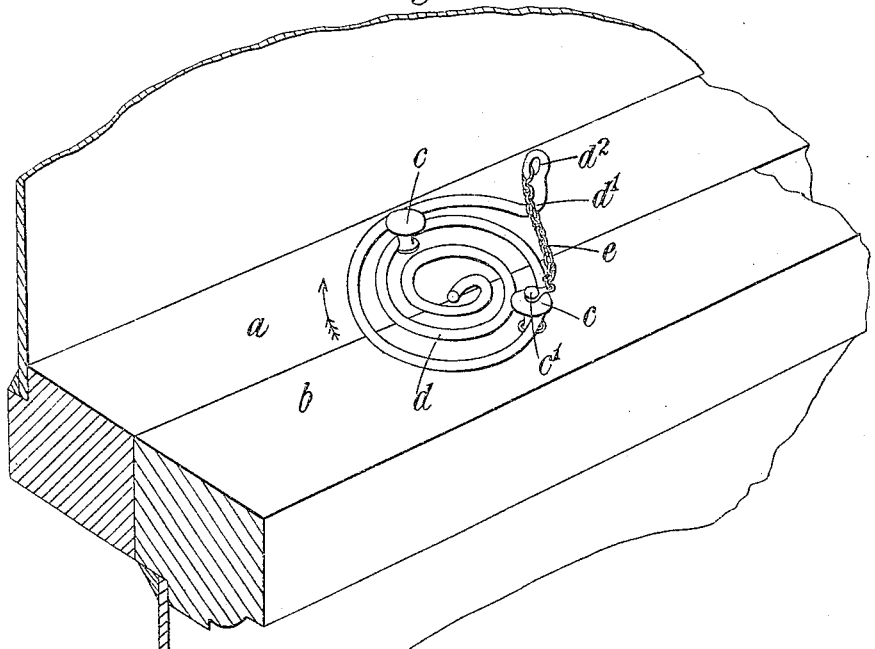
Figure 2:
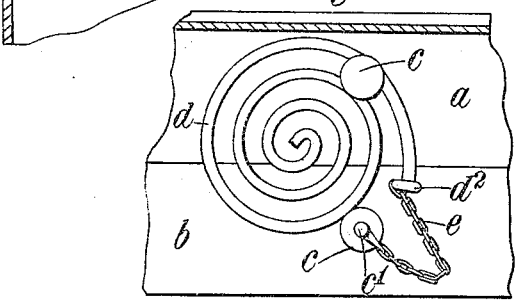
Figure 3:
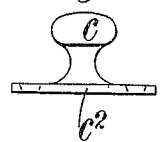
Figure 4:
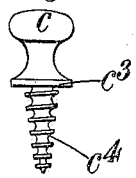
Figure 5:
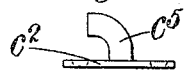

Figure 1 is a fragmentary view in perspective, illustrating the fastening device applied to window-sashes of the usual vertically-sliding type. Fig. 2 is a plan illustrating the position of the fastening device at about the point of disengagement for the purpose of opening the window. Fig. 3 is a detached view of one form of stud applicable for use with the said fastening device and adapted to be secured to the bar of the sash by means of screws. Fig. 4 is a similar view in which the stud is formed with a screw-shank. Fig. 5 illustrates another form of stud which may be found appropriate under certain conditions.

It will be apparent that the fastening device may be applied to various uses in connection with which adjacent parts are required to be held together in contact.

Referring to Figs. 1 and 2, the adjacent bars $a$ and $b$ of the upper and lower sashes are respectively furnished with a stud $c$ or its equivalent, these studs being arranged, preferably, in a direct transverse line in relation to the sash-frame. In conjunction with these studs I employ a fastening device $d$, which may consist of a coil or volute of wire or of metal strip. The wire employed in the construction of the fastening device may be circular, rectangular, or any other convenient form in transverse section and be formed with a handle or bent-up portion $d'$ which may have an eye $d^2$ for the attachment of a chain $e$, the latter serving to connect the fastening device with one of the studs $c$, which may be formed with a lug $c'$, or its equivalent, for securing the chain, the fastening device being thereby held captive.

The studs $c$ may be formed, as shown in Fig. 3, with a plate $c^2$, the attachment to the sash being effected by means of screws inserted in countersunk holes, (indicated by dotted lines in the attaching-plate $c^2$.) Each stud may, however, be formed with a shoulder $c^3$ and a screw-threaded shank $c^4$, as shown in Fig. 4, for screwing into the bar of the sash, or the stud may assume the form of a hook $c^5$, as shown in Fig. 5, its attachment being effected either by means of the plate $c^2$ or by means of a screw-threaded shank, as respectively described with reference to Figs. 3 and 4.

The fastening device $d$ is applied by engaging the outer convolution of the coil with one of the studs $c$ and then turning the device, so that the said convolution is brought into engagement with the other stud $c$. If now that the two studs $c$ are engaged by the coil $d$ the latter be rotated in the direction of the arrow, Fig. 1, the operation will have the effect of gripping the studs and of securely fastening the parts of the sash, as illustrated in Fig. 1. Upon rotating the coil in the reverse direction its disengagement from the studs will be effected, as shown in Fig. 2, in which the coil $d$ is shown almost free from the stud $c$.

The gripping effect of the volute or coil will be enhanced by inclining the sides of the studs, as at $c^6$. This may be effected in the manner shown, or the sides of the studs may be formed with any other suitable inclines.

What I claim, and desire to secure by Letters Patent of the United States, is—

The combination with the meeting-rails of window-sash, of a resilient spirally-coiled fastener loosely disposed on said rails and having an unattached center to provide for unrestricted movement and spring action at the center and throughout its entire length, and projecting devices individually secured to the rails for adjustable engagement with the outer coils of the fastener, the unattached center or inner terminal of the fastener permitting freedom of contraction and expansion of the coils thereof and a greater range of adjustment of the same.

In testimony whereof I have hereunto set my hand, in presence of two subscribing witnesses, this 20th day of February, 1903.

JAMES MURRAY.

Witnesses:
   T. SELLY WARDLE,
   WALTER J. SKERTEN.